US007620469B1

(12) United States Patent
Cusmariu

(10) Patent No.: US 7,620,469 B1

(45) Date of Patent: Nov. 17, 2009

(54) METHOD OF IDENTIFYING DIGITAL AUDIO SIGNAL FORMAT

(75) Inventor: Adolf Cusmariu, Eldersburg, MD (US)

(73) Assignee: The United States of America as represented by the Director of the National Security Agency, Washington, DC (US)

( * ) Notice: Subject to any disclaimer, the term of this patent is extended or adjusted under 35 U.S.C. 154(b) by 744 days.

(21) Appl. No.: 11/489,804

(22) Filed: Jul. 17, 2006

(51) Int. Cl.
*G06F 17/00* (2006.01)

(52) U.S. Cl. ........................................ 700/94; 381/58

(58) Field of Classification Search .................. 700/94; 381/58
See application file for complete search history.

(56) References Cited

U.S. PATENT DOCUMENTS 5,374,916 A * 12/1994 Chu ........................ 340/146.2
5,784,544 A * 7/1998 Stevens ..................... 358/1.13
6,038,400 A * 3/2000 Bell et al. ..................... 710/11
6,205,223 B1 * 3/2001 Rao et al. ..................... 380/42
6,285,637 B1 9/2001 Manter et al.
6,483,988 B1 11/2002 Noguchi et al.
6,918,554 B2 7/2005 Stamm et al.
6,999,827 B1 2/2006 Yong

OTHER PUBLICATIONS

JHOVE—JSTOR/Harvard Object Validation Environment, Available at http://hul.harvard.edu/jhove/, Dec. 12, 2006.

* cited by examiner

*Primary Examiner*—Curtis Kuntz
*Assistant Examiner*—Joseph Saunders, Jr.
(74) *Attorney, Agent, or Firm*—Robert D. Morelli

(57) ABSTRACT

A method of identifying file format, converting file from assumed format and bit ordering to user-definable format, dividing file into blocks, determining frequencies of occurrence in blocks, creating first set of frequencies of occurrence less than and equal to most frequently occurring integer, creating second set of frequencies of occurrence greater than the most frequently occurring integer, creating third set of differences in first sets, creating fourth set of differences in second sets, replacing third and fourth sets with polarity indicators, summing polarity indicators, determining sum percentages, pairing percentages, determining pairing maximum number, determining statistics, determining maximum of statistics, assigning result to converted file, selecting another format and bit ordering and returning to third step, identifying converted file with maximum statistic, and determining format and bit ordering of file to be that of assumed format associated with converted file identified in last step.

20 Claims, 1 Drawing Sheet

METHOD OF IDENTIFYING DIGITAL AUDIO SIGNAL FORMAT

FIELD OF INVENTION

The present invention relates, in general, to data processing for a specific application and, in particular, to digital audio data processing.

BACKGROUND OF THE INVENTION

Audio signals were initially recorded as analog signals. An analog representation of an audio signal has a continuous nature (e.g., a smooth curving line), as opposed to a digital representation of an audio signal, which has a discrete nature. Each sample in a digital representation is a integer in base two, or binary, format, where each binary digit, or bit, in the integer is either a one or a zero.

It is difficult, if not impossible, to copy or transmit an analog representation of a signal perfectly, whereas it is easy to do the same for a digital representation of a signal. Any deviation in an analog representation of an audio signal as compared to the original signal represents loss of audio quality. Since digital representations of audio signals can be copied or transmitted perfectly, it is the preferred representation for audio signals.

There are many different formats for digitally representing an audio signal. The essential characteristics of a digital representation is its encoding scheme (e.g., μ-law (pronounced mu-law), a-law), the integer of bits that represent each sample in the signal (e.g., 8-bit, 16-bit, 32-bit), and the sampling rate per second used to digitize the signal (e.g., 8 KHz, 16 KHz, 32 KHz). The integer of bits that represent a integer is commonly referred to as the word, byte, or block length.

With audio signals increasingly being included in computer communication, different file formats have arisen. Some file formats are self-describing. That is, they include header information that says what digital representation was used to encode the audio signal. However, header information is not always accurate. Other file formats, referred to as headerless formats, do not say what digital representation was used to encode an audio signal. Such formats can be difficult to decipher, and may require one to listen to the audio file.

Computer files include extensions. For example, a file named filename.ext, has ".ext" as its file extension. The most common file extension on the INTERNET include .snd, .au, .aiff .wav, and .mov. The .snd extension is ambiguous because it could indicate the self-describing format of a Next Computer or the headerless format of an Apple Macintosh computer. The .au format is used in SUN Microsystems computers to indicate μ-law encoding. The .aiff format is used in Apple Macintosh computers. The .wav format is used on computers running the Microsoft Windows operating system. The .mov format is used in QuickTime movies. The extension is supposed to indicate the format used to encode the file. However, just as headers in self-describing files do not always describe the file format used, neither do file extensions.

U.S. Pat. No. 6,285,637, entitled "METHOD AND APPARATUS FOR AUTOMATIC SECTOR FORMAT IDENTIFICATION IN AN OPTICAL STORAGE DEVICE," discloses a method of distinguishing between the formats for Compact Disc-Read Only Memory (CD-ROM) and Compact Disc-Digital Audio (CD-DA) on an optical storage device by examining a Q-channel data-type indicator bit. The value of the bit indicates whether the format of the optical storage device is CD-ROM or CD-DA. The present invention does not examine a Q-channel data-type bit to determine format as does U.S. Pat. No. 6,285,637. In addition, U.S. Pat. No. 6,285,637 does not disclose a method of distinguishing between digital audio formats as does the present invention.

U.S. Pat. No. 6,285,637 is hereby incorporated by reference into the specification of the present invention.

U.S. Pat. No. 6,483,988, entitled "AUDIO AND VIDEO SIGNALS RECORDING APPARATUS HAVING SIGNAL FORMAT DETECTION FUNCTION," discloses a method of determining if received audio is in AC-3 format (i.e., Digital Dolby) or in a format supported by MPEG by extracting bit stream and header information. The present invention does not use header information to determine digital audio format. U.S. Pat. No. 6,483,988 is hereby incorporated by reference into the specification of the present invention.

U.S. Pat. No. 6,918,554, entitled "TAPE CARTRIDGE FORMAT IDENTIFICATION IN A SINGLE REEL TAPE HANDLING DEVICE," discloses a method of identifying the format of a tape by including information on a tape cartridge leader that indicates the format of the tape. The present invention does not use information of a leader of tape to determine format as does U.S. Pat. No. 6,918,554. U.S. Pat. No. 6,918,554 is hereby incorporated by reference into the specification of the present invention.

U.S. Pat. No. 6,999,827, entitled "AUTO-DETECTION OF AUDIO INPUT FORMATS," discloses a device for distinguishing between two different digital audio formats, 12S and SPDIF, by detecting edge transmissions and using a time counter to determine the time slot of the received signal. A time slot for 12S is in the range from 81.38 nanoseconds to 488.28 nanoseconds. A time slot for SPDIF is in the range from 5.2 microseconds to 250 microseconds. The format for whichever range encompasses the time slot determined by U.S. Pat. No. 6,999,827 is determined to be the format of the received signal The present invention does not use edge detection and time slot estimation to determine format as does U.S. Pat. No. 6,999,827. U.S. Pat. No. 6,999,827 is hereby incorporated by reference into the specification of the present invention.

JSTOR and Harvard University Library collaborated to develop a framework for format validation of various digital objects. JSTOR is a not-for-profit organization that maintains an archive of important scholarly journals. The framework that was developed is called JHOVE (pronounced "jove"), which stands for the JSTOR/Harvard Object Validation Environment. JHOVE identifies the format of various self-defining digital formats by determining whether or not the signal is formed according to the requirements of a particular digital format (e.g., does the signal contain a required integer at required byte offsets, does the signal contain all of the required components, does the signal include any components that it should not, etc.). The present invention does not determine format by determining whether or not the signal is formed according to the requirements of a particular digital format as does JHOVE. In addition, JHOVE cannot identify a headerless digital format as does the present invention.

There is a need for a method of identifying digital audio formats, whether self-defining or headerless. The present invention is such a method.

SUMMARY OF THE INVENTION

It is an object of the present invention to identify the format of a digital audio signal.

It is another object of the present invention to identify the format of a digital audio signal that is either self-defining or headerless.

The present invention is a method of identifying a format of a digital audio file.

The first step of the method is receiving the digital audio file.

The second step of the method is converting the digital audio file from a user-assumed digital integer audio format and bit ordering to a user-definable digital integer audio format and same bit ordering.

The third step of the method is dividing the converted digital audio file into user-definable blocks.

The fourth step of the method is determining, for each block, a list of unique integers therein and their frequencies of occurrence.

The fifth step of the method is creating, for each result of the fourth step, a first set that includes the frequencies of occurrence of the unique integers less than and equal to the most frequently occurring integer, also known as the mode.

The sixth step of the method is creating, for each result of the fourth step, a second set that includes the frequencies of occurrence of the unique integers greater than the mode.

The seventh step of the method is creating, for each first set, a third set that includes differences between adjacent frequencies of occurrence in the corresponding first set.

The eighth step of the method is creating, for each second set, a fourth set that includes differences between adjacent frequencies of occurrence in the second set.

The ninth step of the method is replacing each element in each third set and fourth set with a user-definable integer that indicates the polarity (or sign) of the element, that is, positive or negative.

The tenth step of the method is summing, for each third set, the polarity integers in the third set.

The eleventh step of the method is summing, for each fourth set, the polarity integers in the fourth set.

The twelfth step of the method is dividing each result of the tenth step by the quantity of integers in the corresponding third set and multiplying by 100.

The thirteenth step of the method is dividing each result of the eleventh step by a quantity of integers in the corresponding fourth set and multiplying by 100.

The fourteenth step of the method is pairing each result of the twelfth step with the result of the thirteenth step that corresponds to the same user-definable block.

The fifteenth step of the method is determining, for each result of the fourteenth step, the maximum number in the pairing.

The sixteenth step of the method is determining, for each result of the fifteenth step, a user-definable number of statistical parameters; means and medians are typical, though not exclusive, examples.

The seventeenth step of the method is determining the maximum of zero and the results of the sixteenth step.

The eighteenth step of the method is assigning the result of the seventeenth step to the converted digital audio file.

The nineteenth step of the method is selecting another digital audio format and bit ordering and returning to the third step if additional digital audio formats and bit orderings are to be tested. Otherwise, proceeding to the next step.

The twentieth step of the method is identifying the converted digital audio file having the maximum assigned integer.

The twenty-first step of the method is determining the format and bit ordering of the received digital audio file to be that of the assumed format associated with the converted digital audio file identified in the twentieth step.

DETAILED DESCRIPTION

Figure 1:
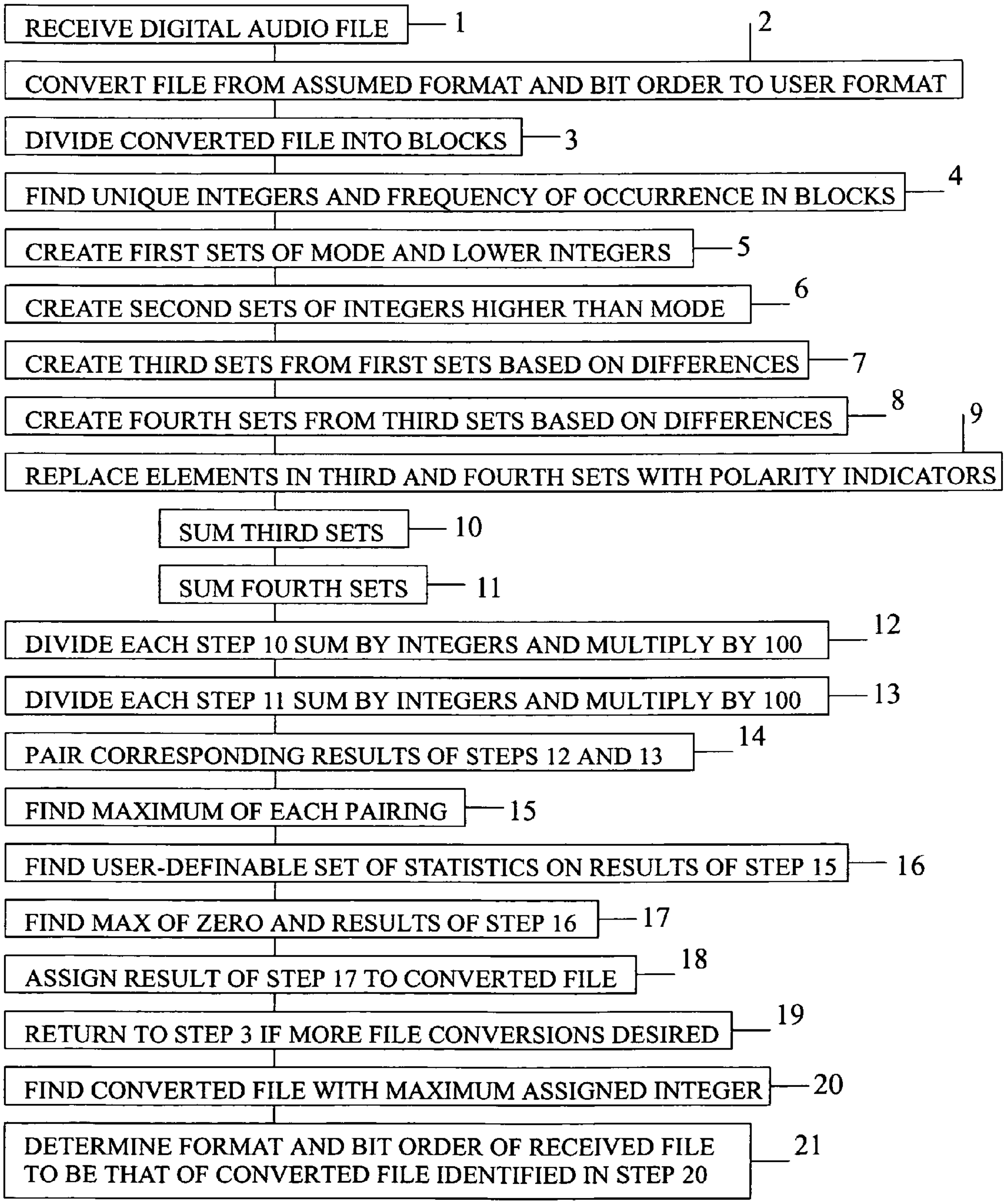
FIG. 1 is a flowchart of the steps of the present invention.

The present invention is a method of identifying a format of a digital audio file.

FIG. 1 is a flowchart of the present invention.

The first step 1 of the method is receiving the digital audio file, where the file includes binary integers that represent the components of the audio signal contained in the file. The received file may be in any digital audio format. Examples of some digital audio formats are listed above.

The second step 2 of the method is converting the digital audio file from a user-assumed digital audio format and bit ordering to a user-definable digital audio format and same bit ordering. In the present invention, the user assumes that the received file is in any integer of candidate formats and bit orderings. The received file will then be converted from the assumed format and analyzed. The converted file that is analyzed most favorably as described by the following steps will be identified as the correct format of the received file. In the first step 1, the user selects the first assumed format to be analyzed. In a subsequent step, another format and bit ordering will be selected and analyzed. This process will continue until the user has analyzed each format and bit ordering that he desires. Examples of bit ordering include Most Significant Bit First (MSBF) and Least Significant Bit First (LSBF). For example, if an audio sample is represented by the integer 23 then it may be represented in binary as either 10111 in MSBF or as 11101 in LSBF. Since each format assumed by the user, there are two possible bit orderings. Therefore, 2N analyses must be performed for N formats assumed. The format of the analysis that results in the highest figure-of-merit is determined to be the format of the received file. In the preferred embodiment, the received file is converted from its assumed format and bit ordering to an 8-bit linear format sampled at 8 KHz, in the same bit ordering.

Converted digital audio files often include long runs of the same, or nearly the same, integer. Such runs take up processing time and do not add proportionately to the accuracy of the result. So, they may be eliminated. In an alternate embodiment, runs of the same, or nearly the same, integer are removed. In the preferred embodiment, a run includes nearly the same integer if no integer in the run differs from any other integer in the run by at most 2.

Digital audio files may employ a large range of integers for better fidelity (e.g., −128 to 128). Using the full range of values takes up processing time and does not add proportionately to the accuracy of result. Therefore, the range of integers in the converted file may be limited. In a second alternate embodiment, integers in the converted file that are outside of a user-definable range are removed. In the preferred embodiment, the user-definable integer range is −15 to 15.

The third step 3 of the method is dividing the converted digital audio file into user-definable blocks. In the preferred embodiment, the converted digital audio file is divided into blocks containing samples comprising 4 seconds in duration at a sampling rate of 8 KHz.

The fourth step 4 of the method is determining, for each user-definable block, a list of unique integers therein and their frequencies of occurrence. In the preferred embodiment, the integers are sorted in order from lowest integer to highest integer. For example, a block may include the following subset of integers: [−4 3 3 3 20 −4 −15 32 3 20 3 32 3 −15 −15 32 3 −28 −28 −4 −28 −15 −4 20 32 29 −4 3 29 20]. The unique integers in this block, from lowest to highest, are [−28 −15 −4 3 20 29 32]. The frequencies of occurrence, or density, for these unique integers are [3 4 5 8 4 2 4].

The fifth step 5 of the method is creating, for each result of the fourth step 4, a first set that includes the frequencies of occurrence of the unique integers less than and equal to the most frequently occurring integer. The most frequently occurring integer in a block of digital audio is commonly referred to as its mode. In the example above, the mode is 3. For the example above, the first set is [3 4 5 8]. A first set will be created for each block in the converted file. The first set represents increasing density.

The sixth step 6 of the method is creating, for each result of the fourth step 4, a second set that includes the frequencies of occurrence of the unique integers greater than the most frequently occurring integer or mode. For the example above, the second set is [4 2 4]. A second set will be created for each block in the converted file. The second set represents decreasing density.

The seventh step 7 of the method is creating, for each first set, a third set that includes differences between adjacent frequencies of occurrence in the corresponding first set, in a next-minus-previous order. In the example above, the first set of [3 4 5 8] results in a third set of [1 1 3] (i.e., the differences between 4 and 3, 5 and 4, and 8 and 5), where the integer on the left is subtracted from the integer on the right. A third set is created for each block. The differences will be used to produce a measure of how often the sign, or polarity, of a segment increases or decreases relative to its length.

The eighth step 8 of the method is creating, for each second set, a fourth set that includes differences between adjacent frequencies of occurrence in the second set. In the example above, the second set of [4 2 4] results in a fourth set of [−2 2] (i.e., the differences between 2 and 4, and 4 and 2), where the integer on the left is subtracted from the integer on the right. A fourth set is created for each block. The differences will be used to produce a measure of how often the sign, or polarity, of a segment increases or decreases relative to its length.

The ninth step 9 of the method is replacing each element in each third set and fourth set with a user-definable integer that indicates the polarity of the element. In the preferred embodiment, a 1 is used to indicate a positive element and a −1 is used to indicate a negative element. In the example above, the third set of [1 1 3] is replaced with [1 1 1], and the fourth set of [−2 2] is replaced with [−1 1]. Similar replacements are made for each third and fourth set.

The tenth step 10 of the method is summing, for each third set, the polarity integers in the third set. In the example above, the third block of [1 1 1] sums to 3. Similar sums are determined for each third set.

The eleventh step 11 of the method is summing, for each fourth set, the polarity integers in the fourth set. In the example above, the fourth block of [−1 1] sums to 0. Similar sums are determined for each fourth set.

The twelfth step 12 of the method is dividing each result of the tenth step 10 by a quantity of polarity integers in the corresponding third set and multiplying by 100. In the example above, the sum of the third set (i.e., 3) is divided by the integer of polarity integers in the third set (i.e., 3) to produce 1. The result (i.e., 1) is then multiplied by 100 to get 100, which is the percentage of the polarity of the elements with respect to its length. Similar percentages are created for each third set.

The thirteenth step 13 of the method is dividing each result of the eleventh step 11 by a quantity of polarity integers in the corresponding fourth set and multiplying by 100. In the example above, the sum of the fourth set (i.e., 0) is divided by the integer of polarity integers in the fourth set (i.e., 2) to produce 0. The result (i.e., 0) is then multiplied by 100 to get 0, which is the percentage of the polarity of the elements with respect to its length. Similar percentages are created for each fourth set.

The fourteenth step 14 of the method is pairing each result of the twelfth step 12 with the result of the thirteenth step 13 that corresponds to the same user-definable block. In the example, the pair for the associated third and fourth sets is [100, 0]. Similar pairs are created for each associated third and fourth sets. These measures represent the local monotonic nature of the density of each block, increasing or decreasing.

The fifteenth step 15 of the method is determining, for each result of the fourteenth step 14, the maximum integer in the pairing. In the example, the maximum element in the pair [100, 0] is 100. Similar maximums will be identified for each pairing.

The sixteenth step 16 of the method is determining, for each result of the fifteenth step 15, a user-definable set of statistics. In the preferred embodiment, the statistics are mean and median. However, other statistics are possible. If in the example above included not only the pairing maximum pairing of 100 but also pairing maximums of 90, 85, 70, and 65 then the mean would be 82 and the median would be 85.

The seventeenth step 17 of the method is determining the maximum of zero and the results of the sixteenth step 16. In the example above, the maximum of 0, 82, and 85 is 85. The result of the seventeenth step is the numerical result of the analysis of the converted file of the received file, where the received file was assumed to be in a user-definable format and bit ordering. This integer will be compared to similarly generated integers for converted files of the received file, where different formats and bit orders are assumed.

The eighteenth step 18 of the method is assigning the result of the seventeenth step 17 to the converted digital audio file.

The nineteenth step 19 of the method is selecting another digital audio format and bit ordering and returning to the third step 3 if additional digital audio formats and bit orderings are to be tested. Otherwise, proceeding to the next step.

The twentieth step 20 of the method is identifying the converted digital audio file having the maximum assigned integer.

The twenty-first, and last, step 21 of the method is determining the format and bit ordering of the received digital audio file to be that of the assumed format associated with the converted digital audio file identified in the twentieth step 20.

In the present invention, the user converted the received file a user-definable number of times, assuming a different combination of format and bit ordering of the received file per conversion. Each converted file was then analyzed to generate a number which represents an estimation of the maximal polarity monotonicity percentage for each file. Then, the converted file that generated the highest such estimate was identified. Finally, the assumed format and bit ordering associated with the converted file with the highest integer was determined to be the format and bit ordering of the received file.

What is claimed is:

1. A method of identifying a format of a digital audio file, comprising the steps of:

a) receiving the digital audio file;

b) converting the digital audio file from a user-assumed digital audio format and bit ordering to a user-definable digital audio format and same bit ordering;

c) dividing the converted digital audio file into user-definable blocks;

d) determining, for each user-definable block, a list of unique integers therein and their frequencies of occurrence;

e) creating, for each result of step (d), a first set that includes the frequencies of occurrence of the unique integers less than and equal to the most frequently occurring integer;

f) creating, for each result of step (d), a second set that includes the frequencies of occurrence of the unique integers greater than the most frequently occurring integer;
g) creating, for each first set, a third set that includes differences between adjacent frequencies of occurrence in the corresponding first set;
h) creating, for each second set, a fourth set that includes differences between adjacent frequencies of occurrence in the second set;
i) replacing each element in each third set and fourth set with a user-definable integer that indicates the polarity of the element;
j) summing, for each third set, the polarity integers in the third set;
k) summing, for each fourth set, the polarity integers in the fourth set;
l) dividing each result of step (j) by a quantity of polarity integers in the corresponding third set and multiplying by 100;
m) dividing each result of step (k) by a quantity of polarity integers in the corresponding fourth set and multiplying by 100;
n) pairing each result of step (l) with the result of step (m) that corresponds to the same user-definable block;
o) determining, for each result of step (n), the maximum integer in the pairing;
p) determining, for each result of step (o), a user-definable set of statistics;
q) determining the maximum of zero and the results of step (p);
r) assigning the result of step (q) to the converted digital audio file;
s) if additional digital audio formats and bit orderings are to be tested then selecting another digital audio format and bit ordering and returning to step (c), otherwise proceeding to the next step;
t) identifying the converted digital audio file having the maximum assigned integer; and
u) determining the format of the received digital audio file to be the assumed format and bit ordering associated with the converted digital audio file identified in step (t).

2. The method of claim 1, wherein the step of converting the digital audio file from a user-assumed digital audio format and bit ordering to a user-definable digital audio format and same bit ordering is comprised of the step of converting the digital audio file from a user-assumed digital audio format and bit ordering, where the bit ordering is selected from the group of bit orderings consisting of Most Significant Bit First and Least Significant Bit First.

3. The method of claim 1, wherein the step of converting the digital audio file from a user-assumed digital audio format and bit ordering to a user-definable digital audio format and same bit ordering is comprised of the step of converting the digital audio file to an 8-bit linear format sampled at 8 KHz and the same bit ordering.

4. The method of claim 1, wherein the step of dividing the converted digital audio file into user-definable blocks is comprised of the step of dividing the converted digital audio file into blocks containing 4 seconds of data sampled at 8 KHz.

5. The method of claim 1, wherein the step of determining, for each user-definable block, a list of unique integers therein and their frequencies of occurrence is comprised of the step of determining, for each user-definable block, a list of unique integers therein and their frequencies of occurrence, wherein the integers are listed in order from lowest integer to highest integer.

6. The method of claim 1, wherein the step of replacing each element in each third set and fourth set with a user-definable integer that indicates the polarity of the element is comprised of the step of replacing each element in each third set and fourth set with a 1 for each positive element and a −1 for each negative element.

7. The method of claim 1, wherein the step of determining, for each result of step (o), a user-definable integer of statistics is comprised of the step of determining, for each result of step (o), a mean and a median.

8. The method of claim 1, further including the step of removing from the result of step (b) runs of integers that differ by no more than a user-definable integer.

9. The method of claim 8, wherein the step of removing from the result of step (b) runs of integers that differ by no more than a user-definable integer is comprised of the step of removing from the result of step (b) runs of integers that differ by no more than a integer selected from the group of integers consisting of 0, 1, and 2.

10. The method of claim 1, further including the step of removing from the result of step (b) integers outside of a user-definable range.

11. The method of claim 10, wherein the step of removing from the result of step (b) integers outside of a user-definable range is comprised of the step of removing from the result of step (b) integers outside of a range of −15 to 15.

12. The method of claim 11, wherein the step of converting the digital audio file from a user-assumed digital audio format and bit ordering to a user-definable digital audio format and same bit ordering is comprised of the step of converting the digital audio file to an 8-bit linear format sampled at 8 KHz and the same bit ordering.

13. The method of claim 12, wherein the step of dividing the converted digital audio file into user-definable blocks is comprised of the step of dividing the converted digital audio file into blocks containing 4 seconds of data sampled at 8 KHz.

14. The method of claim 13, wherein the step of determining, for each user-definable block, a list of unique integers therein and their frequencies of occurrence is comprised of the step of determining, for each user-definable block, a list of unique integers therein and their frequencies of occurrence, wherein the integers are listed in order from lowest integer to highest integer.

15. The method of claim 14, wherein the step of replacing each element in each third set and fourth set with a user-definable integer that indicates the polarity of the element is comprised of the step of replacing each element in each third set and fourth set with a 1 for each positive element and a −1 for each negative element.

16. The method of claim 15, wherein the step of determining, for each result of step (o), a user-definable set of statistics is comprised of the step of determining, for each result of step (o), a mean and a median.

17. The method of claim 16, further including the step of removing from the result of step (b) runs of integers that differ by no more than a user-definable integer.

18. The method of claim 17, wherein the step of removing from the result of step (b) runs of integers that differ by no more than a user-definable integer is comprised of the step of removing from the result of step (b) runs of integers that differ by no more than a integer selected from the group of integers consisting of 0, 1, and 2.

19. The method of claim 18, further including the step of removing from the result of step (b) integers outside of a user-definable range.

20. The method of claim 19, wherein the step of removing from the result of step (b) integers outside of a user-definable range is comprised of the step of removing from the result of step (b) integers outside of a range of −15 to 15.

* * * * *